United States Patent

[11] 3,627,275

[72] Inventor Frederick E. Gusmer
 1121 Ocean Ave., Mantoloking, N.J. 08738
[21] Appl. No. 37,055
[22] Filed May 13, 1970
[45] Patented Dec. 14, 1971
 Original application Jan. 9, 1967, Ser. No. 608,050, now abandoned. Divided and this application May 13, 1970, Ser. No. 37,055

[54] APPARATUS FOR PRODUCING PLASTIC FOAM
 5 Claims, 1 Drawing Fig.
[52] U.S. Cl................................................. 259/4, 23/252
[51] Int. Cl................................................. B01f 15/04
[50] Field of Search........................................ 259/7, 8, 23, 24, 5, 6, 4, 9, 10; 23/252; 260/2.5

[56] References Cited
UNITED STATES PATENTS
| | | | |
|---|---|---|---|
| 3,164,374 | 1/1965 | Ralph............................ | 259/8 |
| 2,847,196 | 8/1958 | Franklin........................ | 259/8 |
| 2,958,516 | 11/1960 | Wall.............................. | 259/8 |
| 3,297,306 | 1/1967 | Napier.......................... | 259/8 |

Primary Examiner—Robert W. Jenkins
Attorney—Young & Thompson

ABSTRACT: A low-boiling foaming agent such as dichlorodifluoromethane is added to one of the reactive liquids of a system for forming a foam such as polyurethane foam, by pumping the reactive components and the foaming agent to elevated pressure in three separate pumps that are mechanically linked so as to maintain a fixed delivery ratio to each other, then mixing the foaming agent with one of the liquids, and finally mixing that latter mixture with the other reactive liquid and ejecting a single stream of material that foams on a substrate and then cures.

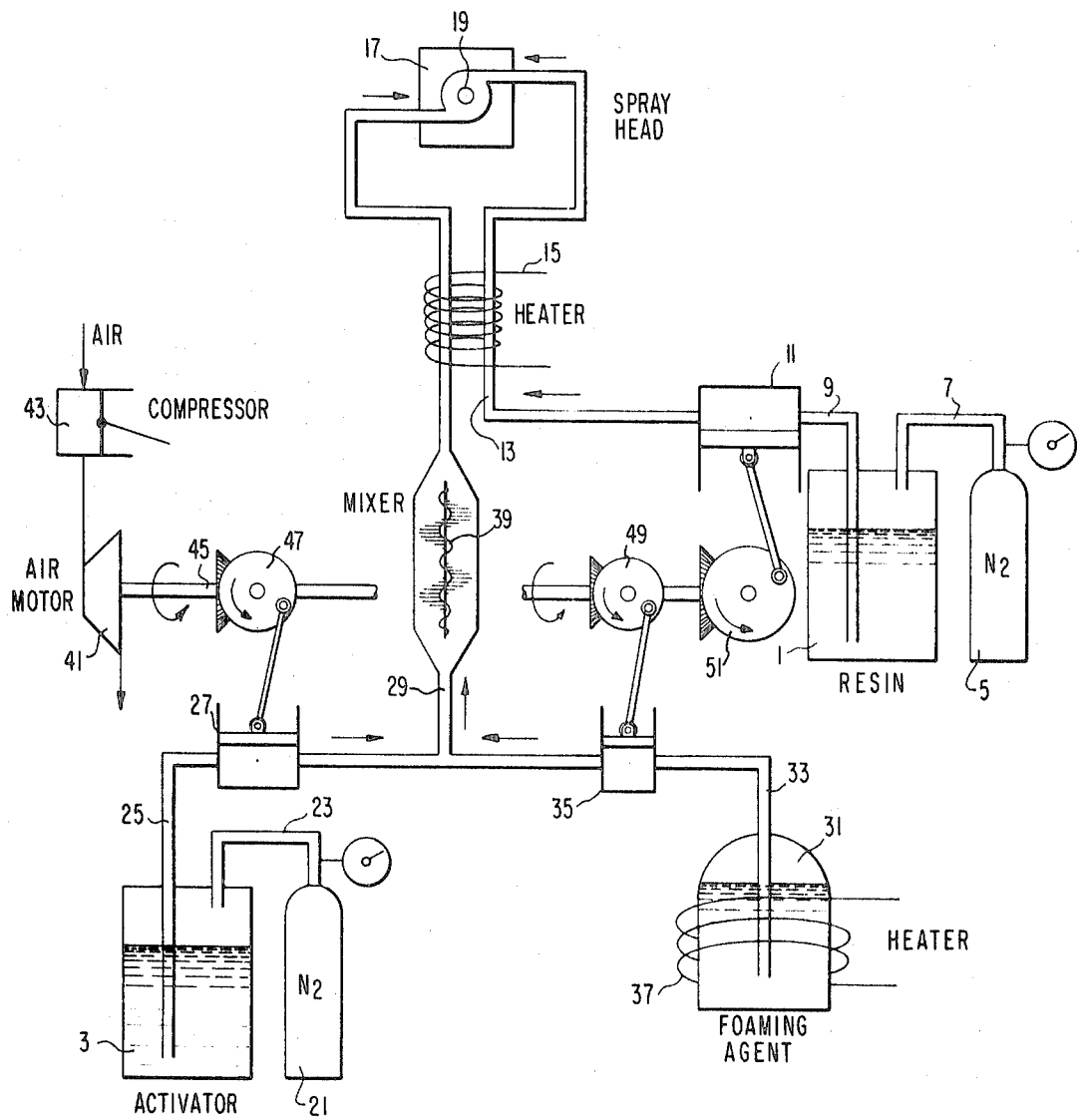
INVENTOR
FREDERICK E. GUSMER

APPARATUS FOR PRODUCING PLASTIC FOAM

This application is a division of copending application Ser. No. 608,050, filed Jan. 9, 1967 now abandoned.

This invention relates to the production of plastic foams, more particularly by inclusion of an inert foaming agent that vaporizes to form the foam in situ.

In the formation of such plastic foams, it is already known to incorporate such a foaming agent in the mixture. The foaming agent is initially in liquid phase, but vaporizes at the temperature of the mixture, or at the temperature of the substrate on which the mixture is deposited, or under the influence of the heat generated by the exothermic reaction, to form a multiplicity of bubbles after the material has been deposited on the substrate. Of course, to some extent during bubble formation, but primarily after bubble formation, the plastic foam cures by the reaction of the mutually reactive liquid components, with the result that a self-supporting tack-free foam is ultimately produced. Such foams are useful not only as external coatings for insulating or sound-deadening or cushioning purposes, but also as internal fillings for the same and other purposes. Thus, such foams may in their final form have an exposed surface or no exposed surface.

However, difficulties are encountered in connection with pore-forming systems embodying these foaming agents as heretofore used. Specifically, if the foaming agent has a relatively high boiling point, then not only is the production of a foam retarded with the result that the applied mass may streak and run, when applied to vertical surfaces, before the foam is adequately formed, but also the substrate to which it is applied can act as a heat sink. The heat of the exothermic curing reaction may be quite adequate to vaporize the foaming agent in the interior of the foam and to maintain the foaming agent in vapor phase, but against a relatively cold substrate the foam tends to collapse and to form a relatively dense, unfoamed layer. As a result, a substantial proportion of what would otherwise be the thickness of the foam is lost, and the applied volume of foam is substantially less than the theoretical maximum.

One obvious solution for this problem is to heat the substrate to which the foam is applied. This has been done, but it is an expensive procedure even for relatively small substrates; and for large substrates such as the surfaces of completed buildings, the heating of the substrate is completely impractical.

Another obvious solution to the problem is to use a foaming agent that has a lower boiling point, so that even if the substrate is relatively cold, the temperature of the substrate will still be high enough to vaporize the foaming agent. But low boiling point is bought at the price of high-vapor pressure at ordinary atmospheric temperatures, and the foaming agents of low boiling point thus become impractical to handle by conventional methods. One such conventional method is to store the foaming agent in admixture with one of the reactive liquid components. But the problems of storage are very great, because the entire mass must then be maintained at very low temperature or in a vessel that can withstand great pressure. The production and maintenance of large pressure vessels make such a technique impractical. On the other hand, the foaming agent could be added to the liquid mixture at the time of use, but there was no known practical way to do this.

Accordingly, it is an object of the present invention to provide apparatus for producing plastic foam, characterized in that the finished foam has a volume that is much closer to the theoretical maximum than had heretofore been possible and characterized by a relative absence of dense, unfoamed skin next to the substrate.

Another object of the present invention is the provision of such apparatus in which the use of large pressure vessels and other expensive and troublesome equipment is avoided.

Finally, it is an object of the present invention to provide such apparatus that will be dependable in structure and rugged and durable in use.

Other objects and advantages of the present invention will become apparent from a consideration of the following description, taken in connection with the accompanying drawing, which is a schematic diagram and flow sheet of apparatus according to the present invention.

Briefly, the present invention is the discovery that relatively lower boiling foaming agents can be employed, without the drawbacks recited above, if the inert foaming agent and the two mutually reactive liquids are pumped separately to a common elevated pressure, and then the foaming agent is mixed with one of the liquids, and finally that resulting mixture and the other reactive liquid are mixed together and immediately ejected on the substrate where the foam forms in situ by vaporization of the foaming agent and the reactive liquids react to cure the foam.

Referring now to the drawing in greater detail, there is shown apparatus according to the present invention, in which the two mutually reactive liquids are stored in and dispensed from containers 1 and 3. For purposes of illustration in the drawing, the liquids in these two containers are designated "resin" and "activator". It will be understood, however, that the legends on the drawing are merely illustrative in this respect.

The container 1 is maintained under positive pressure, for example, 1–2 p.s.i.g., by a compressed inert gas above it, as supplied from a tank 5 of nitrogen or the like, from which the gas passes through a conduit 7 to the top of the container 1. The liquid in container 1 leaves through conduit 9 under control of a positive displacement pump 11 by which its pressure is raised at least several times. If desired, a transfer pump (not shown) may be used to pump the liquid from container 1 to the intake of pump 11. The nitrogen replaces the liquid leaving container 1 and prevents contamination from moisture in the air. The liquid from container 1, in precisely controlled quantity, then passes through conduit 13 and may be heated in a heater 15 which may be of the electrical resistance or other type, and then passes to one of the inlet openings of a spray head 17 which may be of conventional construction or may be constructed as in my U.S. Pat No. 3,263,928, Aug. 2, 1966. Spray head 17 is characterized by a pair of inlet openings and a single axial outlet opening 19. Of course, if the construction of my above-identified patent is used, then the outlet opening 19 will be of the same diameter as the cylindrical chamber of the spray head.

The other reactive liquid, in the vessel 3, is covered by nitrogen or other inert gas under low-positive pressure in a tank 21, which is conducted to the top of vessel 3 by a conduit 23. The reactive liquid leaves through a conduit 25, if desired under the impetus of a transfer pump (not shown), and under precise control of a positive displacement pump 27 by which its pressure is raised at least several times. The liquid at elevated pressure from pump 27 then enters a conduit 29.

The foaming agent is contained in a smaller, relatively high-pressure vessel 31 which is designed to withstand pressures of 100 p.s.i.g. or more. The foaming agent in liquid phase leaves container 31 under its own pressure, through a conduit 33, whence it passes through and is raised at least several times in pressure in a positive displacement pump 35, after which it enters conduit 29. The outlet pressures of pumps 27 and 35 are about equal.

The foaming agent is a relatively low-boiling liquid that is inert to the reactive liquids. In order to keep the foaming agent from flashing through the pump 35 or otherwise vaporizing prematurely in the equipment, the foaming agent in the container 31 is maintained at a temperature which is about 10° higher than ambient temperature. To this end, a heater 37, which again may be an electrical resistance heater, maintains the elevated temperature of the container 31. The foaming agent in container 31 is at its boiling point at the temperature in question, so that as it passes through the relatively colder portions of the equipment, it is subcooled and its tendency to flash off a gas or to boil is substantially or completely overcome. Of course, the same result can be achieved by cooling pump 35 instead of heating container 31.

The reactive liquid from container 3 and the foaming agent from container 31 thus pass together through conduit 29 on the way toward spray head 17. To mix them, it has been found possible to employ a stationary mixer 39 in conduit 29. Mixer 39 is in the form of a plug made up of a great number of lengths of metal wire, so that the unmixed liquids passing through mixer 39 will undergo a great deal of comminution and agitation, so that a true mixture will be formed. As the two liquids in question are preferably miscible with each other, and as the foaming agent is preferably a good solvent for the reactive liquid in conduit 29, the mixing in mixer 39 is substantially complete.

The conduit 29 then extends through heater 15 and thence to the other inlet opening of spray head 17. As is well known from my earlier patents, a substantially complete mixing of the two liquids entering spray head 17 takes place in the chamber of the spray head, so that the resultant ejected mixture is substantially homogeneous.

It should be particularly noted that the foaming agent and one of the reactive liquids are mixed downstream of the pumps 27 and 35. The pumps 11, 27 and 35 raise their respective liquids to substantially the same pressure, so that mixing can take place first through mixer 39 and then in spray head 17, with no feedback through any of the converging conduits.

A very important feature of the invention is that the pumps 11, 27 and 35 are mechanically interconnected for conjoint operation at flow rates whose relationship to each other remains constant. To this end, a common drive is provided for all three pumps, including an air motor 41 driven by compressed air from a compressor 43. Air motor 41 turns a drive shaft 45 that has gearing 47, 49 and 51 thereon. The gearing 47, 49, and 51 meshes with the drive gearing of the piston pumps 27, 35 and 11, respectively, to ensure that all three pumps operate precisely simultaneously and at constant speed ratios relative to each other. Thus, the ratio of the three liquids (two reactive and one the foaming agent) is maintained exact at all times.

Alternatively, air motor 41 can be of the reciprocating type and can be directly mechanically connected to pumps 27, 35 and 11 through a common drive yoke.

The critical temperature which determines the temperature at which the foam forms and cures is the target temperature, that is, the temperature of the substrate on which the foam is deposited. Therefore, in order to ensure bubble formation by the foaming agent from container 31, this foaming agent should have a boiling point at atmospheric pressure which is at least about 10° F. lower than the target temperature, more preferably at least about 15° F. below that temperature. The target temperature will of course vary, depending on the ambient temperature and other factors; and certain of the higher boiling suitable foaming agents for container 31 may not be useful in very cold weather. Among the suitable foaming agents for container 31 are dichlorodifluoromethane, propane, chlorotrifluoromethane, chlorodifluoromethane, and sym-dichlorotetrafluoroethane. Of these, the last is unsuitable for use in cold weather. Particularly preferred is dichlorodifluoromethane.

By the practice of the present invention, it is also possible to use higher boiling foaming agents which are stored in admixture with one or the other of the reactive liquids. As mentioned above, the storage of the solutions of the higher boiling foaming agent in one of the reactive liquids is possible in low-pressure vessels; but the difficulty had been that the substrate cooled the adjacent foam-forming material to the point that that these higher boiling foaming agents did not vaporize and foam did not form adjacent the substrate, and a dense skin formed next to the substrate and a great deal of the volume of the foam was lost. But with the more highly volatile foaming agent admixed with one of the reactive liquids, a substantial proportion of higher boiling foaming agent can be used in addition to the lower boiling foaming agent, because the lower boiling foaming agent will immediately form a foam and prevent the formation of a dense layer adjacent the substrate, and the higher boiling foaming agent can then foam under the influence of the heat of the exothermic curing reaction and/or the influence of the heat imparted to the foam-forming material by the heater 15.

To promote optimum mixing in the chamber of spray head 17, it is preferred that the liquids entering the chamber have as nearly the same viscosity as possible, and as nearly the same volume as possible. Therefore, the selection of which reactive liquid should receive the low-boiling foaming agent from container 31, and which reactive liquid should have the higher boiling foaming agent already in admixture therewith, will be regulated by these factors. As the foaming agents are, generally speaking, solvents for the reactive liquids, it will ordinarily be found convenient to add the low-boiling foaming agent to one of the reactive liquids and to store the high boiling foaming agent with the other of the reactive liquids. However, persons skilled in this art will readily understand the balancing of the factors that dictate which foaming agent goes with which liquid. Of course, the low-boiling foaming agent can be added to the liquid that already contains the high-boiling foaming agent.

The high-boiling foaming agents, if used, should not boil below about 70° F. nor above about 150° F. Among the many suitable higher boiling foaming agents are trichlorofluoromethane and methylene chloride, the former being preferred.

Additional factors that can make the use of two different foaming agents preferable to the use of a single lower boiling foaming agent alone, may be lower cost of the higher boiling foaming agent as compared to the lower boiling foaming agent, and also the fact that flashing of the lower boiling foaming agent in the spray head 17 will of course be reduced the less of this lower boiling foaming agent is used.

Another factor that suggests mixing the low-boiling foaming agent with one of the reactive liquids and the high-boiling foaming agent with the other of the reactive liquids is the desirability of keeping the viscosities of both reactive liquids about equal, not only at the ambient temperature at which these liquids are pumped by pumps 11 and 27, but also at the elevated temperature at which these liquid systems are mixed in the spray head. Thus, it is convenient to compound the liquid that has the high-boiling foaming agent stored in it, so that its viscosity at room temperature will be around 300–500 centipoises, and so that its viscosity when heated to, say, 150° F. in heater 15 will be slightly less than 100 centipoises, and to maintain the same conditions for the other reactive liquid. It is similarly convenient to maintain a pressure ratio on the upstream and downstream sides of the pumps 11, 27 and 35 that is about 8 or 10 to 1. Thus, if the positive pressure imposed on the liquids by transfer pumps is, say, 50 to 80 p.s.i.g., then an appropriate downstream pressure for the three pumps 11, 27 and 35 would be 500 to 800 p.s.i.g., the pressure in container 31 being maintained perhaps a little higher in order to reduce flashing downstream of container 31, as discussed above.

The reactive liquids themselves, in containers 1 and 3, may have a chemical identity that is as broad as the known field of curable or thermosetting resins. Thus, foams according to the present invention may be polyurethane, polyester, epoxide, or other types of foam. If epoxy compounds are to be cured, then as curing agent or "activator" may be used amineterminated polymers or other known curing agents. Polyisocyantes are useful curing agents for hydroxyl-terminated polymers such as polyester polyols and polyalkalene ether glycols. Agents containing a plurality of active hydrogen groups, such as amido, amino, carbamyl, hydroxyl, imido, imino, mercapto, sulfino, sulfo, sulfonamido, thiocarbamyl, ureido and urethaneo, can be used with isocyanato-terminated polymers. For curable ethylenically unsaturated compounds, activators or curing agents or cross-linking agents such as sulfur and dicumyl peroxide can be used.

Examples of self-curing organic liquid mixtures which can be formed in spray head 17 are mixtures of amines and epoxide-terminated polyalkylene ether polyurethanes, as disclosed in U.S. Pat. No. 2,830,038; mixtures of a polytetramethylene ether glycol and 1,3-bis(3-isocyanato-p-tolyl) urea, as in U.S. Pat. No. 2,858,298; mixtures of polyurethane diamines and epoxy resins, as in U.S. Pat. No. 2,888,439; mixtures of polyester polyols and polyisocyanates, as in the article by Bayer et al. in "Rubber Chemistry and Technology", Vol. 23, pp. 812–835; mixtures of polyester polyurethanes and N,N'-$\beta$-dihydroxyethyl urea, as in U.S. Pat. No. 2,822,349; mixtures of polyisocyanate-modified polyesters and glycols, as in U.S. Pat. No. 2,729,628; mixtures of polyisocyanate-modified polyesters and diamines or aminoalcohols, as in U.S. Pat. No. 2,620,516; mixtures of isocyanato-terminated polyalkylene ether polyurethanes and aliphatic polyols, as in British Pat. No. 733,624; and mixtures of isocyanato-terminated polyalkylene ether thioether glycols and diamines or diols, as in U.S. Pat. No. 2,917,489.

Particularly preferred are polyurethane foams. When one of the reactive liquids contains terminal isocyanto groups, the foam may be cured by adding organic compounds having a plurality of alcoholic hydroxyl groups or amino groups. In particular, these curing agents may be defined as being low-molecular weight organic polyols or organic diamines. At least about 0.5 mole of organic diamine should be employed for every mole of free isocyanto group in the isocyantoterminated organic liquid composition. Arylene diamines are preferred; however, aliphatic diamines may be used under certain circumstances. It is to be understood that the term "arylene diamines" means those compounds in which each of the two amino groups is attached directly to an aromatic ring. Representative examples of these amines are 4,4'-methylene-bis-(2-chloroaniline), 4,4'-methylene-bis(2-carbomethoxyaniline), 4,4'-diaminodiphenyldisulfide, and 4,4'-diaminodiphenylsulfone. Other useful arylene diamines are: 4,4'-methylene-bis(2-methylaniline), 4,4'-methylene-bis(2-methoxyaniline), 4,4'-methylene-bis(3-bromoaniline) and 4,4'-methylenedianiline. Mixtures of diamines may be used. Aliphatic diamines which may be used include 1;6-hexamethylenediamine, 1,2propanediamine, ethylenediamine, cadaverine, putrescine, piperazine, and 2,5-dimethylpiperazine.

The organic polyols may be substituted for part or all of the diamine for reaction with the isocyanato-terminated organic liquid composition. The amount of polyol employed should be sufficient to provide about 1 alcoholic hydroxyl group for each free isocyanato group. In other words, a stoichiometric equivalent amount should be used. Representative glycols include ethylene glycol; propylene glycol; trimethylene glycol; 1,2-butylene glycol; 1,3-butanediol; 1,4-butanediol; 1,5-pentanediol; 1,2-hexylene glycol; 1,10-decanediol; 1,2-cyclohexanediol; 2-butene-1,4-diol; 3-cyclohexene-1,1-dimethanol; 4-methyl-3-cyclohexene-1,1-dimethanol; 3-methylene-1,5-pentanediol; diethylene glycol; (2-hydroxyethoxy)-1-propanol; 4-(2-hydroxyethoxy)-1-butanol; 5-(2-hydroxypropoxy)-1-pentanol; 1-(2-hydroxymethoxy)-2-hexanol; 1-(2-hydroxypropoxy)-2-octanol; 3-allyloxy-1,5-pentanediol; 2-allyoxymethyl-2-methyl-1,3-propanediol; [(4-pentyloxy)methyl]-1,3-propanediol; 3-(o-propenylphenoxy)-1,2-propanediol; thiodiglycol; 2,2'-[thiobis-(ethyleneoxy)]diethanol; polyethyleneether glycol (molecular weight 200); and 2,2'-isopropylidenebis(p-phenyleneoxy)diethanol.

Also, may be used triols such as glycerol; 1,2,6-hexanetriol; 1,1,1-trimethylolpropane; 3-(2-hydroxyethoxy)-1,2-propanediol; 3-(2-hydroxypropoxy)-1,2-propanediol; 2,4-dimethyl-2-(2-hydroxyethoxy)methylpentanediol-1,5; 1,1,1[[(-hydroxy-ethoxyl)methyl]ethane; 1,1,1-tris[(2-hydroxypropoxylmethyl]propane; triethanolamine; and triisopropanolamine; and mixtures thereof.

Mixtures of two or more of the above polyols may be used if desired.

Suitable polyisocyanates for compounding of the other reactive liquid include toluene-2,4-diisocyanate; 1,6-hexamethylenediisacyanate; 1,4-tetramethylene-diisocyanate; 1,10-decamethylenediisocyanate; 1,5-naphthalenediisocyanate; cumene-2,4-diisocyanate; 4-methoxy-1,3-phenylenediisocyanate; 4-chloro-1,3-phenylenediisocyanate; 4-bromo-1,3-phenylenediisocyanate; 4-ethoxy-1,3-phenylenediisocyanate; 2,4'-diisocyanato-diphenylether; 5,6-dimethyl-1,3-phenylenediisocyanate; 2,4-dimethyl-1,3-phenylenediisocyanate; 4,4'-diisocyanatodiphenyl-ether; benzidinediisocyanate; 4,6-dimethyl-1,3-phenylenediisocyanate; 9,10-anthracenediisocyanate; 4,4'-diisocyanatodibenzyl; 3,3-dimethyl-4,4'-diisocyanatodiphenylmethane; 2,6-dimethyl-4,4'-diisocyanatodiphenyl; 2,4-diisocyanatostilbene; 3,3'-dimethyl-4,4'-diisocyantodiphenyl; 3,3'-dimethoxy-4,4'-diisocyantodiphenyl; 1,4-anthracenediisocyanate; 2,5-fluorene-diisocyanate; 1,8-naphthalenediisocyanate; 2,6-diisocyanato-benzfuran; and 2,4,6-toluenetriisocyanate.

In order to enable persons skilled in this art to practice the invention, the following illustrative example is given:

EXAMPLE

For the reactive liquid in container 1, there is formed, by simple mixing, a mixture of 280 pounds of the polyol of British Pat. No. 1,002,272 (sold by Jefferson Chemical Company under the name "Thanol R–650–X"), 65 pounds of $(C_2H_5O)_2 P(O)CH_2N(C_{24}OH)_2$ as a fire retardant, 860 grams of organosilicone block polymer of example 1a of U.S. Pat. No. 2,834,748 as a stabilizing agent, 575 grams of stannous octoate for use as a catalyst in addition to the inherent catalysis of the polyol, and 152 pounds of trichlorofluoromethane. This material is maintained in container 1 at a temperature of 77° F. under nitrogen, and it has a viscosity of 400 centipoises.

The material in container 3 is polymethylene polyphenylisocyanate, also at a pressure of 80 p.s.i.g. under compressed nitrogen and a temperature of 77° F. and a viscosity of 400 centipoises.

The foaming agent in container 31 is dichlorodifluoromethane, at a temperature of 87° F. and a self pressure of 90 p.s.i.g.

The pumps 11, 27 and 35 all have a downstream or output pressure of 800 p.s.i.g. The gearing 51, 47, 49 is chosen so that these three pumps 11, 27 and 35 deliver at a volume ratio of 60–48–5, respectively. Thus, 60 parts by volume of the liquid in container 1, 48 parts by volume of the liquid in container 3, and five parts by volume of the liquid in container 31 are fed during a given time period. The characteristics of spray head 17 are such that the total spray is 10 pounds of mixed material per minute. The heater 15 is so arranged that the material in both of conduits 13 and 29 is heated to 150° F. Mixer 39 is in the form of a rifle-bore brush, in which helically twisted central wire grasps a helical series of radially disposed metal wire bristles, the brush being simply inserted in a portion of conduit 29 of the same inside diameter as the rest of conduit 29, and held in that position by the friction of the slightly deformed wire bristles against the inner wall of the conduit.

The mixture from spray head 17, which is initially substantially devoid of bubbles, is deposited as an exposed layer on a vertical surface, where it quickly attains a depth of 1 inch. No streaking or running is observed, as the foam forms immediately. The resin cures shortly thereafter and is substantially tack free in 15 seconds. It is rigid at that time but hot, at a core temperature of about 250° F. It cools within 15 minutes, at which time its rigidity is even more improved and it can support loads in excess of 20 p.s.i.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. Apparatus for ejecting a mixture of liquids that form a foam on a substrate and that cure by reacting with each other, comprising a positive displacement pump for pumping a first stream comprising one of the liquids to elevated pressure, a positive displacement pump for pumping to about said elevated pressure a second stream comprising another of said liquids, a positive displacement pump for pumping to about said elevated pressure a liquid foaming agent that is inert to the other said liquids and that boils at a temperature below the temperature of the substrate, direct mechanical linkages positively interconnecting said three pumps for conjoint operation at predetermined rates having a predetermined relation to each other, means for mixing said foaming agent in liquid phase and said first stream downstream of said pumps to form a combined stream, and ejector means for mixing said combined stream and said second stream and for ejecting said mixture onto a substrate.

2. Apparatus as claimed in claim 1, and storage means for a supply of said foaming agent, and temperature regulating means for maintaining said foaming agent pump at a temperature substantially lower than said supply of foaming agent.

3. Apparatus as claimed in claim 1, said means for mixing said foaming agent and said first stream comprising a conduit through which the foaming agent and said first stream flow toward said ejector means, and a fixed mixing device secured in said conduit remote from said ejector means.

4. Apparatus as claimed in claim 3, said mixing device comprising a plug highly permeable to the flow of liquid therethrough and made up of a multiplicity of lengths of wire.

5. Apparatus as claimed in claim 1, said ejector means comprising a cylindrical chamber with an axial outlet opening, and means for separately introducing said combined stream and said second stream into said chamber.

* * * * *